(12) United States Patent
Bromley

(10) Patent No.: US 8,924,366 B2
(45) Date of Patent: Dec. 30, 2014

(54) DATA STORAGE DEDUPLICATION SYSTEMS AND METHODS

(75) Inventor: Graham Bromley, Dublin, CA (US)

(73) Assignee: Symantec Corporation, Mountain View, CA (US)

( * ) Notice: Subject to any disclaimer, the term of this patent is extended or adjusted under 35 U.S.C. 154(b) by 36 days.

(21) Appl. No.: 13/235,277

(22) Filed: Sep. 16, 2011

(65) Prior Publication Data

US 2013/0073527 A1 Mar. 21, 2013

(51) Int. Cl.
*G06F 7/00* (2006.01)
*G06F 17/00* (2006.01)
*G06F 17/30* (2006.01)
*G06F 3/06* (2006.01)

(52) U.S. Cl.
CPC ........ *G06F 17/30156* (2013.01); *G06F 3/0641* (2013.01)
USPC ....................................................... 707/692

(58) Field of Classification Search
None
See application file for complete search history.

(56) References Cited

U.S. PATENT DOCUMENTS

| | | | |
|---|---|---|---|
| 5,990,810 A | 11/1999 | Williams | |
| 8,478,730 B2 * | 7/2013 | Aronovich et al. | 707/692 |
| 2011/0016097 A1 * | 1/2011 | Teerlink | 707/693 |
| 2011/0246741 A1 * | 10/2011 | Raymond et al. | 711/170 |
| 2011/0258398 A1 * | 10/2011 | Saliba et al. | 711/154 |
| 2012/0005171 A1 * | 1/2012 | Anglin et al. | 707/692 |

OTHER PUBLICATIONS

A. Muthitacharoen et al., "A Low-Bandwidth Network File System," ACM SIGOPS Operating Systems Review, vol. 35, Issue 5, pp. 174-187, Dec. 2001, http://dl.acm.org/citation.cfm?id=502052.
A. Muthitacharoen et al., "A Low-Bandwidth Network File System," Lecture Notes, pp. 1-26, 2002, http://www.scs.stanford.edu/nyu/02fa/notes/l15.pdf.
Quantum Corp., "Data Deduplication Background: A Technical White Paper," pp. 1-13, Jan. 2009, http://www.gosignal.com/whitepapers/quantum1.pdf.

* cited by examiner

*Primary Examiner* — Rehana Perveen
*Assistant Examiner* — Raheem Hoffler
(74) *Attorney, Agent, or Firm* — Wilmer Cutler Pickering Hale and Dorr LLP

(57) ABSTRACT

Storage systems and methods are presented. In one embodiment, a variable length segment storage method comprises: receiving a data stream; performing a tailored segment process on the data stream, wherein at least one of a plurality of tailored segments include corresponding data of at least one of a plurality of variable length segments and alignment padding to align with boundaries of a fixed length de-duplication scheme; performing a de-duplication process on the plurality of tailored segments; and storing information corresponding to the result of the de-duplication process. In one embodiment, the tailored segment process includes adjusting the alignment padding of the at least one of a plurality of tailored segments, wherein an adjustment in the alignment padding of the at least one of a plurality of tailored segments corresponds to a modification in the at least one of the plurality of variable length segments.

18 Claims, 12 Drawing Sheets

100

110
Receiving a data stream.

120
Performing a tailored segment process on the data stream.

130
Performing a de-duplication process on the plurality of tailored segments.

140
Storing information corresponding to the result of the de-duplication process.

FIG 1A

FIG 3

500

---

510
Performing a variable length segmenting association process on the data.

---

520
Performing a padding process on the data.

---

530
Creating a map object including a segment descriptor for each tailored segment associated with the data

FIG 5

610
Determining corresponding variable length data in at least one of the plurality of tailored segments is changed.

620
Deleting a first portion of the padding from at least one of the corresponding plurality of tailored segments, the size of the first portion of padding equal to the size of data added by the change in the data in the at least one of the plurality of variable length segments.

630
Adding a second portion of padding to the at least one of the corresponding plurality of tailored segments, the size of the second portion of padding equal to the size of data deleted by the change in the data in the at least one of the plurality of variable length segments.

FIG 6

| 710 Variable Length Segment |
|---|

| 721 Tailor | 722 Tailor | 723 Tailor | |
|---|---|---|---|
| Variable | Variable | Variable | PAD |

FIG 7

DATA STORAGE DEDUPLICATION SYSTEMS AND METHODS

FIELD OF THE INVENTION

The present embodiments relate to the field of information storage and de-duplication.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information.

The information and data generated and utilized by various systems is often valuable and extensive and losing the data can be very detrimental. A number of traditional approaches attempt to utilize data recovery and backup scenarios to facilitate preservation of the data. However, traditional approaches often involve storage of large amounts of duplicate information. Resources expended storing and tracking this duplicate information can be very complex and expensive. These problems are often exacerbated when a small amount of data is modified in a fixed length segmenting storage scheme or architecture. In some scenarios, conventional attempts at fixed length de-duplication systems typically force an effective shift of the data beyond fixed length blocks of the de-duplication system making it very difficult for the fixed length de-duplication attempts to identify a significant amount of duplicate information.

SUMMARY

Storage systems and methods are presented. In one embodiment, a variable length segment storage method comprises: receiving a data stream; performing a tailored segment process on the data stream, wherein at least one of a plurality of tailored segments include corresponding data of at least one of a plurality of variable length segments and alignment padding to align with boundaries of a fixed length de-duplication scheme; performing a de-duplication process on the plurality of tailored segments; and storing information corresponding to the result of the de-duplication process. In one embodiment, the tailored segment process includes adjusting the alignment padding of the at least one of the plurality of tailored segments, wherein an adjustment in the alignment padding of the at least one of the plurality of tailored segments corresponds to a modification in the at least one of the plurality of variable length segments.

It is appreciated that a variety of operations can be performed by the variable length segment storage method. The tailored segment process can include: determining corresponding variable length data in at least one of the plurality of tailored segments is changed; deleting a first portion of the padding from the at least one of the corresponding plurality of tailored segments, the size of the first portion of padding equal to the size of data added by the change in the data in the at least one of the plurality of variable length segments; and adding a second portion of padding to the at least one of the corresponding plurality of tailored segments, the size of the second portion of padding equal to the size of data deleted by the change in the data in the at least one of the plurality of variable length segments. The de-duplication process can be performed by a fixed length de-duplication system. The tailored segment process can include: performing a variable length segmenting association process on the data; performing a padding process on the data; and creating a map object including a segment descriptor for each tailored segment associated with the data. In one exemplary implementation, anchor points are associated with the data of each respective one of the plurality of the variable length segments and the size of each of the plurality of variable length segments is bounded within a range. The contents of the tailored segments can be compressed.

In one embodiment, a reprogrammable tangible computer readable medium has stored thereon, computer executable instructions that when executed by a computer system cause the computer system to perform a method comprising: receiving a data stream; performing a tailored segment process on the data stream, wherein at least one of a plurality of tailored segments include corresponding data of at least one of a plurality of variable length segments and alignment padding to align with boundaries of a fixed length de-duplication scheme; performing a de-duplication process on the plurality of tailored segments; and storing information corresponding to the result of the de-duplication process. In one embodiment, the tailored segment process includes adjusting the alignment padding of the at least one of the plurality of tailored segments, wherein an adjustment in the alignment padding of the at least one of the plurality of tailored segments corresponds to a modification in the at least one of the plurality of variable length segments.

It is appreciated that a variety of operations can be performed in accordance with instructions stored on the computer readable medium. The tailored segment process can include: determining corresponding variable length data in at least one of the plurality of tailored segments is changed; deleting a first portion of the padding from the at least one of the corresponding plurality of tailored segments, the size of the first portion of padding equal to the size of data added by the change in the data in the at least one of the plurality of variable length segments; and adding a second portion of padding to the at least one of the corresponding plurality of tailored segments, the size of the second portion of padding equal to the size of data deleted by the change in the data in the at least one of the plurality of variable length segments. The de-duplication process can be performed by a fixed length de-duplication system. The tailored segment process can include: performing a variable length segmenting association process on the data; performing a padding process on the data; and creating a map object including a segment descriptor for each tailored segment associated with the data. In one exemplary implementation, anchor points are associated with the data of each respective one of the plurality of the variable length segments and the size of each of the plurality of variable length segments size is bounded within a range. The contents of the tailored segments can be compressed.

In one embodiment, a computer system comprises: a processor coupled to a computer readable storage media and executing computer readable code which causes the computer system to perform operations including: receiving a data stream; performing a tailored segment process on the data stream, wherein at least one of a plurality of tailored segments include corresponding data of at least one of a plurality of variable length segments and alignment padding to align with boundaries of a fixed length de-duplication scheme; performing a de-duplication process on the plurality of tailored segments; and storing information corresponding to the result of the de-duplication process. In one embodiment, the tailored segment process includes adjusting the alignment padding of the at least one of the plurality of tailored segments, wherein an adjustment in the alignment padding of the at least one of the plurality of tailored segments corresponds to a modification in the at least one of the plurality of variable length segments.

It is appreciated that a variety of operations can be performed by the processor in accordance with instructions included on the computer readable medium. The tailored segment process can include: determining corresponding variable length data in at least one of the plurality of tailored segments is changed; deleting a first portion of the padding from the at least one of the corresponding plurality of tailored segments, the size of the first portion of padding equal to the size of data added by the change in the data in the at least one of the plurality of variable length segments; and adding a second portion of padding to the at least one of the corresponding plurality of tailored segments, the size of the second portion of padding equal to the size of data deleted by the change in the data in the at least one of the plurality of variable length segments. The de-duplication process can be performed by a fixed length de-duplication system. The tailored segment process can include: performing a variable length segmenting association process on the data; performing a padding process on the data; and creating a map object including a segment descriptor for each tailored segment associated with the data. In one exemplary implementation, anchor points are associated with the data of each respective one of the plurality of the variable length segments and the size of each of the plurality of variable length segments size is bounded within a range. The contents of the tailored segments can be compressed.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 1A is a block diagram of an exemplary variable length segment storage method in accordance with one embodiment of the present invention.

FIG. 3 is a block diagram illustrating exemplary tailored segment modifications in accordance with one embodiment of the present invention.

FIG. 5 is a block diagram of an exemplary tailored segment process in accordance with one embodiment of the present invention.

FIG. 6 is a block diagram of an exemplary tailored segment process when a modification to data is made in accordance with one embodiment of the present invention.

FIG. 7 is a block diagram of an exemplary variable length segment spanning multiple fixed length blocks of a de-duplication system in accordance with one embodiment of the present invention.

DETAILED DESCRIPTION

Figure 1B:
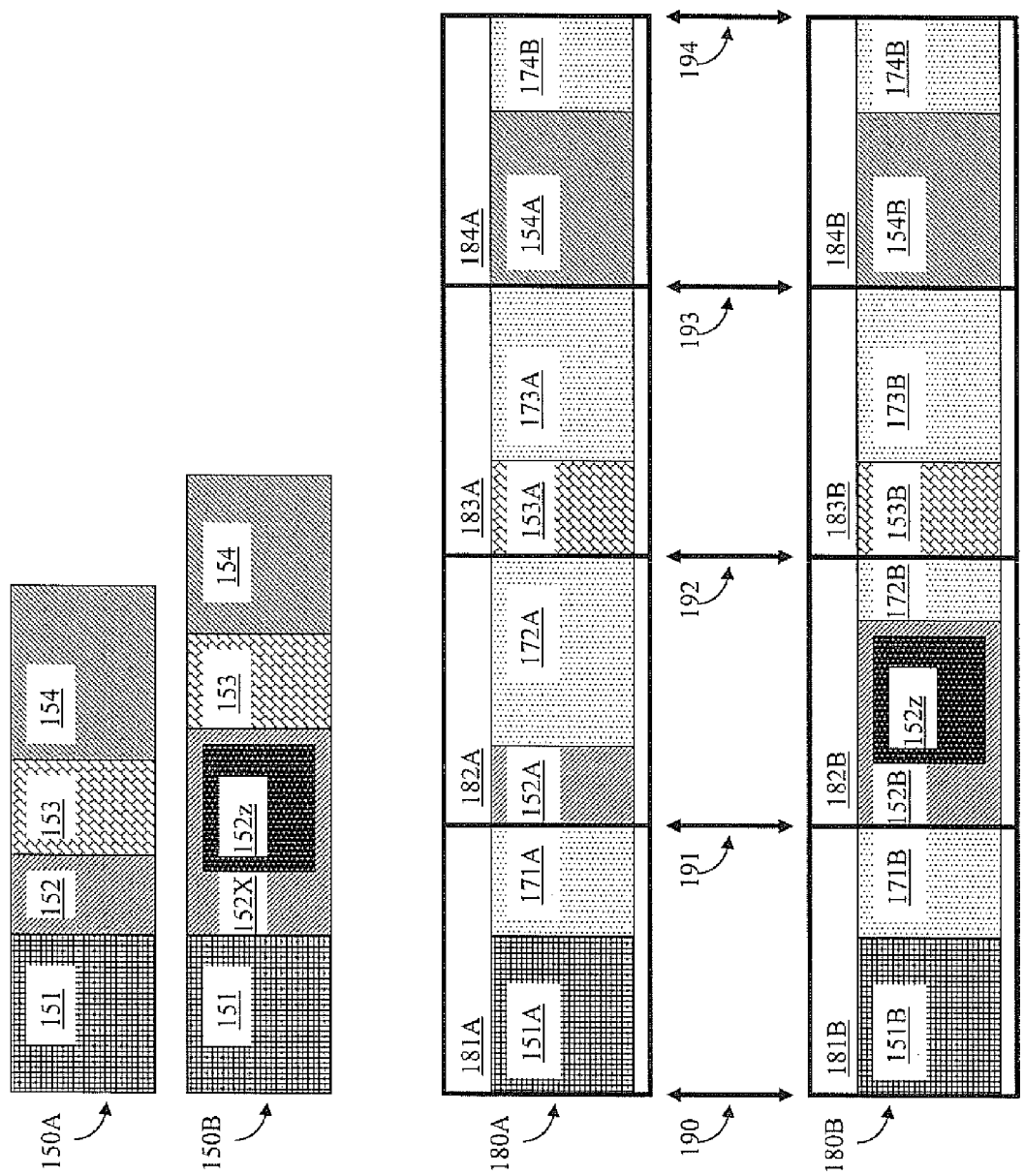
FIG. 1B is a block diagram of exemplary tailored segment configuration in accordance with one embodiment of the present invention.

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

Data de-duplication systems and methods described in the following detailed description can facilitate efficient and effective de-duplication of information. The de-duplication systems and methods can be utilized to de-duplicate variable length segment data in a storage system. In one embodiment, de-duplication systems and methods can enable a fixed length de-duplication system to find duplicate segments in an opaque data stream or file, without any dependency on stream format. In one exemplary implementation, de-duplication systems and methods enable: a) de-duplication of any stream or file to the extent duplicates are present, b) including being amenable to de-duplication of shifting of data within a file or stream (e.g., due to a modification changed data, edited test file, etc.), c) without disassembling the stream or file to facilitate de-duplication. The de-duplication systems and methods can subsume extent-based file systems beneath fixed blocks, given that an extent can be a whole number of fixed blocks. The de-duplication systems and methods can allow variable-length de-duplication to operate with a fixed block storage system, with little or no modification to the storage system. In one embodiment, de-duplication systems and methods can allow variable-length de-duplication to be implemented on a file system with embedded fixed length block de-duplication.

In one embodiment, data de-duplication systems and methods include a very thin layer (e.g., filter driver, anchoring plug in, etc.) interposed between a data source and a fixed length de-duplication system. In one exemplary implementation, the fixed length de-duplication system itself is not modified to handle the variable length segment data de-duplication nor is the fixed length de-duplication system aware that variable length segmenting is being imposed on the data stream. In one embodiment, an anchoring plug in anchors the stream into variable length segments in such a way that the fixed length de-duplication system can find duplicate segments effectively. In one exemplary implementation, tailored segments are utilized to facilitate de-duplication of variable length segment content by fixed length block de-duplication systems. The tailored segments include content of variable length segments tailored to be aligned with block boundaries of a fixed length de-duplication system by including padding with the variable length segment content. Thus, a variable length segment within a tailored segment can be effectively aligned on fixed block boundaries in the fixed length duplication system and can be extended to occupy a whole number of fixed length blocks, thus allowing the fixed length de-duplication system to find duplicates.

FIG. 1A is a block diagram of exemplary variable length segment storage method 100 in accordance with one embodiment of the present invention.

In block 110, a data stream is received. It is appreciated the data stream can include a variety of different types of data. The data stream can include a sequence of files, a backup stream, one big file, a database dump, an image, or any other type of data.

In block 120, a tailored segment process is performed on the data stream. In one embodiment, the tailored segment process creates a plurality of corresponding tailored segments. In one exemplary implementation, at least one of the plurality of tailored segments includes corresponding data of at least one of a plurality of variable length segments and alignment padding to align with boundaries of a fixed length de-duplication scheme. The alignment padding can be utilized to facilitate modifications to the content or data of a variable length segments while maintaining anchoring to a de-duplication block boundary. In one exemplary implementation, padding is deleted or added in a tailored segment as content or data of a variable length data segment is added or deleted to and from the tailored segment. Additional information on the tailored segments including variable segment data and padding is set forth in following sections of the detailed description.

In block 130, a de-duplication process is performed on the tailored segments. In one embodiment, the de-duplication process is performed by a fixed length de-duplication system. A de-duplication process can include comparing information associated with one version of a data stream to another version of a data stream and removing or deleting at least some duplicate portions from the second data stream. It is appreciated a variety of de-duplication processes can be utilized. The de-duplication can be based upon a comparison of a hash value associated with a first version of a tailored segment to a hash value associated with a second version of the tailored segment.

In block 140, information corresponding to the result of the de-duplication process is stored. In one embodiment, information resulting directly from the de-duplication process is stored in a memory device. In one embodiment, information resulting from the de-duplication process is compressed and results of the compression are stored in a memory device. In one exemplary implementation, the resulting information can be stored in a file system.

FIG. 1B is a block diagram of an exemplary tailored segment configuration in accordance with one embodiment of the present invention. Row 150A is a graphical representation of a data stream including variable length segments 151A, 152A, 153A and 154A before a change or modification. Row 150B is a graphical representation of a data stream including variable length segments 151B, 152B, 153B and 154B after a change or modification in which additional information 152Z is added to variable length segment 152A to form variable length segment 152B. It is appreciated that additional information 152Z can be configured in a variety of units (e.g., bits, bytes, etc.). Rows 180A and 180*b* illustrate tailored segments corresponding to information included in variable length segments of rows 150A and 150B. Row 180A is a graphical representation of tailored segments 181A, 182A, 183A and 184A before the change or modification. Tailored segments 181A, 182A, 183A and 184A include contents corresponding to data of variable length segments 151A, 152A, 153A and 154A and padding 171A, 172A, 173A and 174A, respectively. Row 180E is a graphical representation of tailored segments 181B, 182B, 183B and 184B after the change or modification. Tailored segments 181B, 182B, 183B and 184B include contents corresponding to data of variable length segments 151B, 152B, 153B and 154B and padding 171B, 172B, 173B and 174B, respectively. Tailored segment 152B includes the additional information 152*z* and the content of the variable length segment 152B is a corresponding amount more or bigger than the amount of information in variable length segment 152A while padding 173B smaller or less than padding 173A. The amount of reduction or removal of padding 172A is the same size or quantity (e.g., bits, bytes, etc.) as the size or quantity of information in additional information 152Z.

As illustrated in the FIG. 1B, the tailored segments 181B, 182B, 183B and 184B remain anchored to the same respective anchor points (e.g., indicated by the double arrows 190, 191, 192, 193, and 194) as the tailored segments 181A, 182A, 183A and 184A. It is appreciated that the change or modification of adding information 152Z caused a change in the contents of tailored segment 182B relative to tailored segment 182A. However, it is also appreciated that the change or modification of adding information 152Z did not cause a change in the contents of tailored segments 181B, 182B and 183B relative to tailored segments 181B, 182B and 183B respectively. Thus, in one embodiment, a fixed length de-duplication performed on the information of row 180B with respect to 180A identifies tailored segments 181B, 183B and 184B as duplicates. In one exemplary implementation the duplicate tailored segments 181B, 183B and 184B are removed or deleted.

In one embodiment, the tailor segments facilitate association the variable length segments with anchor point and the size the variable length segments size is bounded within a range. It is appreciated there can be a variety of ranges (e.g., 4K bytes to 12K bytes, 1K byte to 100 K byte, 8 bits to 32 bits, etc.). There also can be an average length (e.g., 8K bytes, 15K bytes, 24 bits, etc.). The selection of the tailor segment size and respective variable length segment size and padding size can be adjusted to accommodate tradeoff considerations between consuming resources and storage for the de-duplication processes them selves against resulting effective de-duplication and consumption of storage resources. In one embodiment, adding padding consumes approximately 3% to 7% more storage but the de-duplication operations result in identification of approximately 95% duplicate information that can be removed from a backup. In one exemplary implementation, the tailored segment size is selected large enough to reduce de-duplication operations associated with establishing and storing tailored segment fingerprint information while keeping the selected tailored segment size is kept relatively small to facilitate a relatively small variable length segment size to allow greater comparison granularity associated with achieving greater de-duplication and the padding size is relatively small to avoid storage consumption for padding. In one exemplary implementation, the tailored segment size and the associated. In one embodiment, the variable length size is a multiple of the fixed length block de-duplication size (e.g., a multiple of 8, 11, 16, etc.).

Figure 2:
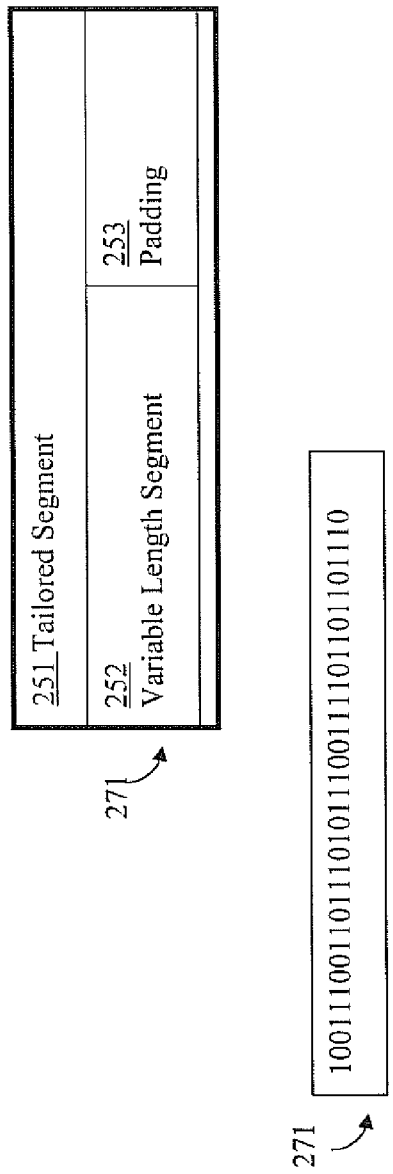
FIG. 2 is a block diagram of information developed into exemplary tailored segments in accordance with one embodiment of the present invention.

FIG. 2 is a block diagram of information developed into exemplary tailored segments in accordance with one embodiment of the present invention. In row 270 an exemplary generic tailored segment 251 I accordance with one embodiment is shown. Generic tailored segment 251 includes variable length segment 252 and padding 253. In one embodiment, padding 253 includes alignment padding to align the tailored segment with boundaries of a fixed length de-duplication scheme. While the following discussion is explained in terms of numbers of bits within a tailored segment scheme, it is appreciated the present system and methods are compatible with a variety of information units (e.g., bits, bytes, etc.). Row 271 includes information (e.g., bits, bytes, etc.) in a data stream that can be received in accordance with one exemplary implementation. Row 272 is a block diagram of the information from row 271 segmented into variable length segments 211 (9 bits), 212 (4 bits), 213 (11 bits), 214 (5 bits) and 215 (8 bits). Row 273 is a block diagram of tailored segments 231, 232, 233, 234 and 235 including information from variable length segments 211, 212, 213, 214 and 215 and padding 221, 222, 223, 224 and 225. In one exemplary implementation, boundaries of a fixed length de-duplication system are 12 bits apart.

As shown in FIG. 2, each of the tailored segments 231, 232, 233, 234 and 235 are 12 bits wide and conveniently aligned with boundaries of a fixed length de-duplication system that are 12 bits apart, even though the tailored segments 231, 232, 233, 234 and 235 include variable length segments 211, 212, 213, 214 and 215 respectively. Tailored segment 231 includes 12 bits comprising 8 bits of variable length segment 211 and 4 bits of padding 221. Tailored segment 232 includes 12 bits comprising 4 bits of variable length segment 212 and 8 bits of padding 222. Tailored segment 233 includes 12 bits comprising 11 bits of variable length segment 213 and 1 bit of padding 223. Tailored segment 234 includes 12 bits comprising 5 bits of variable length segment 214 and 7 bits of padding 224. Tailored segment 235 includes 12 bits comprising 8 bits of variable length segment 215 and 4 bits of padding 225. The padding (e.g. 221, 222, 223, 224 225, etc.) facilitates modification of the contents or data in the variable length segment portions (e.g., 211, 212, 213, 214 215, etc.) while maintaining tailored segment alignment for fixed length de-duplication architectures.

FIG. 3 is a block diagram illustrating exemplary tailored segment modifications in accordance with one embodiment of the present invention. Row 371 is a block diagram of tailored segments 331A, 332A, 333A, 334A and 335A including information from variable length segments 311A, 312A, 313A, 314A and 315A and padding 321A, 322A, 323A, 324A and 325A respectively. Row 372 is a block diagram of tailored segments 331B, 332B, 333B, 334B and 335B including information from variable length segments 311B, 312B, 313B, 314B and 315B and padding 321B, 322B, 323B, 324B and 325B respectively. Row 372 is similar to row 371 except row 372 includes a modification to tailored segment 332B in which 4 bits 1001 are added to variable length segment 312B and 4 bits of padding are deleted from block 322B. While the contents of tailored segment 332B have changed or are different from the tailored segment 332A, the contents of 331B, 333B, 334B and 335B remain the same as the contents of 331A, 333A, 334A and 335A. The corresponding tailored segments of row 371 and 372 maintain segment lengths of 12 bits (e.g., at the beginning and end of the modification, etc.) and the de-duplication boundaries remain the same, enabling the de-duplication process to readily identify tailored segments 331B, 333B, 334B and 335B as duplicates of 331A, 333A, 334A and 335A respectively.

Row 373 is similar to row 371 except row 373 includes a modification to tailored segment 233C in which 4 bits 1001 are deleted from variable length segment 313C and 4 bits of padding are added to block 322C. While the content of tailored segment 333C has changed or are different from the tailored segment 333A, the contents of 331C, 332C, 334C and 335C remain the same as the contents of 331C, 332C, 334C and 335C. The corresponding tailored segments of row 371 and 373 maintain segment lengths of 12 bits (e.g., at the beginning and end of the modification, etc.) and the de-duplication boundaries remain the same, enabling the de-duplication process to readily identify tailored segments 331C, 332C, 334C and 335C as duplicates of 331A, 332A, 334A and 335A respectively.

Figure 4:
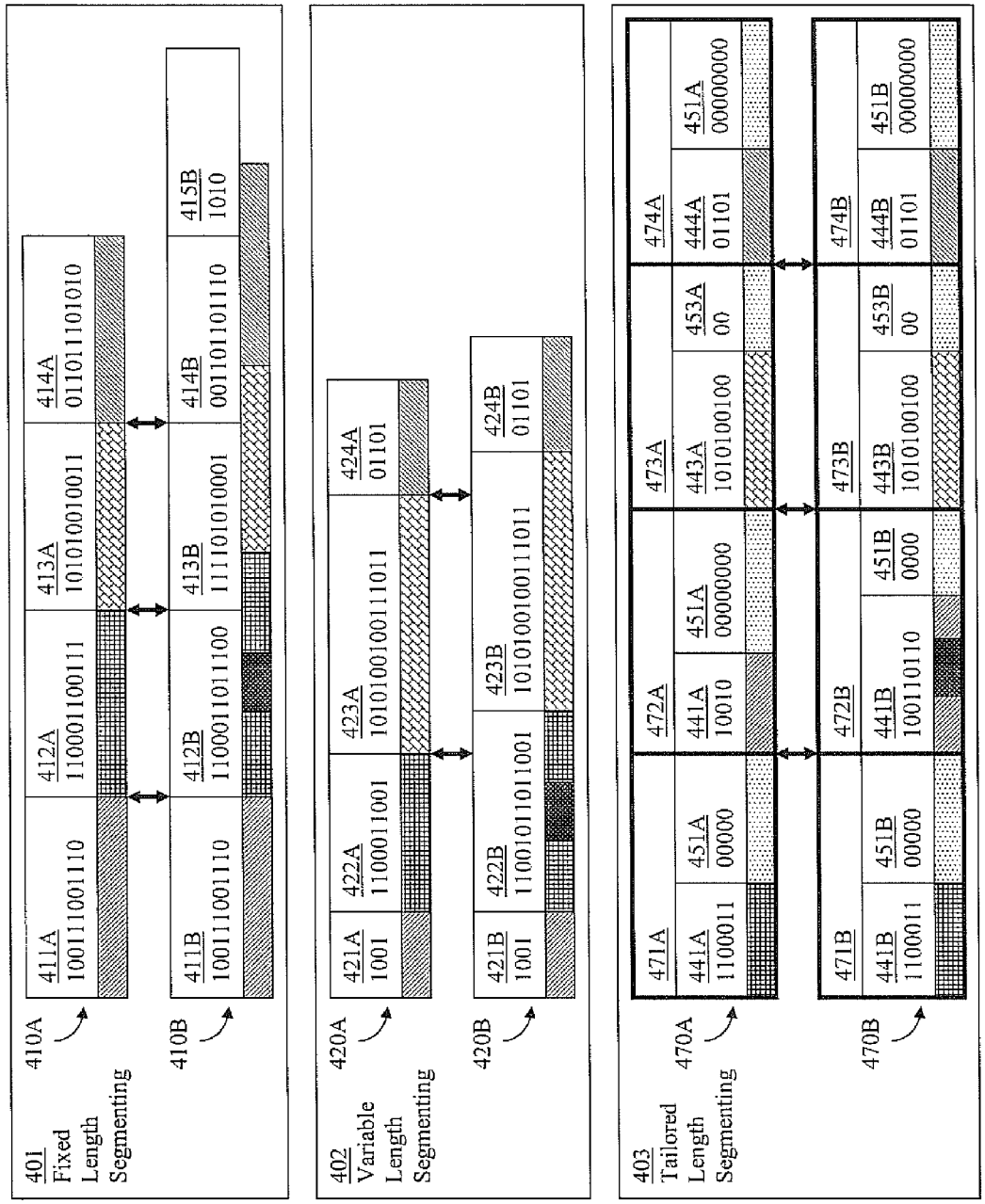
FIG. 4 is a block diagram illustrating an exemplary difference between fixed length segmenting, variable length segmenting and tailored length segmenting in accordance with one embodiment of the present invention.

FIG. 4 is a block diagram illustrating an exemplary difference between fixed length segmenting 401, variable length segmenting 402 and tailored length segmenting 403 in accordance with one embodiment of the present invention. The graphical "shaded" boxes below the segments are included to assist illustration of modifications and shifts in the bits of the various segments.

Fixed length segmenting 401 includes row 410A with fixed length segments 411A, 412A, 413A and 414A before a modification and corresponding row 410B with fixed length segments 411B, 412B, 413B and 414B after a modification. The modification is adding 4 bits 1001 to segment 412B. As can be observed in the figure, the data is shifted to the right after the modification. Thus, when de-duplication is performed on row 410B only the information of fixed length segment 411B is identified as a duplicate of the information in fixed length segment 411A even though there is fair amount of other duplicate information in row 410B that is not identified as duplicate information by the de-duplication process. For example, the 4 bits of information "shifted" into fixed length segments 413B and 414B and they are no longer literally duplicate of the information in block 413A and 414B, however a fair amount of information is duplicate information (e.g., as indicated by similarly shaded boxes in rows 410A and 410B).

Variable length segmenting 402 includes row 420A with variable length segments 421A, 422A, 423A and 424A before a modification and corresponding row 420B with variable length segments 421B, 422B, 423B and 424B after a modification. The modification is adding 4 bits 1001 to segment 422B. As can be observed in the figure, adding the 4 bits of data just increases the length of the variable length segment 422B as compared to variable length segment 422A. The contents of variable length segments 421A, 423A and 424A remain the same as the contents of variable length segments 422A, 423A and 424A. However, when fixed length de-duplication is performed the results do not accurately reflect duplication because the contents with respect to the fixed length block de-duplication boundaries (e.g., indicated by the double arrows) is shifted and will provide inefficient results similar those set forth above with respect to the fixed length segmenting 401 modification. A fair amount of duplicate information in row 430B is not identified as duplicate by the de-duplication process.

Tailored segmenting 401 includes row 470A with tailored segments 471A, 472A, 473A and 474A before a modification and corresponding row 470B with tailored segments 471B, 472B, 473B and 474B after a modification. The modification is adding 4 bits 1001 to segment 472B. As can be observed in the figure, the 4 bits 1001 are added to segment 472B without impact to the other tailored segments 471B, 473B and 474B. As the 4 bits 1001 are added to the variable length segment 441 portion of tailored segment 472B, 4 bits are deleted from the padding 451B of tailored segment 472B. In one embodiment, the "impacts" of the modification are confined to within a respective tailored segment. Thus, when fixed length block de-duplication is performed on row 470 the information of tailored segments 471B, 473B and 474B are identified as duplicates of the information in tailored segments 471A, 473A and 474A.

Present systems and methods can facilitate efficient and effective de-duplication compared to traditional attempts. Present systems and methods can facilitate efficient and effective backup of content of variable length segments in a fixed length de-duplication system. In traditional file systems it is difficult or impossible to implement variable-length segmenting, to obtain benefits of content-independence and shifted-data de-duplication in conjunction with a fixed length de-duplication system. Conventional attempts at modifications to de-duplication systems to handle variable length segments usually involve massive intrusion into a de-duplication system implementation. Some conventional approaches attempt ad initio development of a file system around requirements of variable length segments (e.g., Data Domain's DDS). Variable-length segmenting cannot usually be simply imposed on a fixed-length block file system. For example, seeking within a file, using fixed blocks, typically involves indexing into an array of block pointers; whereas for variable length segments, some kind of tree search is utilized (for efficient random seeks). In addition, block allocation and de-allocation can also be substantially different between variable length and fixed block file systems.

In some traditional attempts, a backup data set is stored to a fixed length de-duplication system of a cluster file system (CFS). Conventional attempts at extracting a data set to its component files to try de-duplication can amount to a restore operation concurrent with backup and involve imposition of massive overhead. One problem is that traditional attempts involve anchor points that are determined relative to fixed offsets in the stream, rather than being attached to the data itself irrespective of the data position within the stream. For example, suppose a file system containing 100 GB is stored as a backup image, into a single large cluster file system and before a next backup a file system, the file system is slightly modified so that the next backup image contains new or different information (e.g., new file, new bytes, new bits, etc.) at the beginning of the data set. Conventional approaches typically shift the data in the second data set by the size of the new or different information and few if any duplicate segments are detected.

Furthermore, even conventional attempts include attempts at extracting the image into discrete CFS files, discrete files that include shifted data usually do not de-duplicate efficiently for similar reasons. Conventional efforts at de-duplicating shifted data involving use of variably length segmenting in which attempts are made to attach segment boundaries to the data and shift within the stream as the data itself shift, but conventional variable length approaches are not usually amenable to convenient fixed length de-duplication. For example, even if traditional attempts at inserting a single byte at offset 0 in the stream could cause the first segment to grow by one byte while subsequent segments remain unchanged, when the segments are fed into a fixed length de-duplication system the segment contents would still appear a change due to the shifting effect, and few if any information would be identified as duplicate information.

FIG. 5 is a block diagram of an exemplary tailored segment process 500 in accordance with one embodiment of the present invention. In one embodiment the tailored segment process 500 is performed by an anchoring plug in.

In block 510, a variable length segmenting association process is performed on the data. In one embodiment, the data stream is segmented into variable length segments. The data stream can be segmented using a variable length anchoring algorithm. It is appreciated that a variety of different variable length segmenting algorithms can be utilized. In one embodiment, MIT'S LBFS approach uses a rolling hash and defines anchoring points where the hash values meet a particular criterion. In one exemplary implementation, a 48 byte window is slid through the stream while a Rabin fingerprint is calculated at each byte position and the next anchor point occurs where the low order 13 bits of the Rabin hash are 0, with a probability of 1/213, giving an average variable length segment size of 8K. The variable length segment size can be bounded to eliminate pathological end cases. It is appreciated there can be a variety of bounding values (e.g., minimum 2 k, minimum 4K, maximum 16 k, maximum 64K, etc.). The rolling hash algorithm can serve to identify points in the stream that stand out in some way, so that matching anchor points (and hence segments) can be found in the stream that is subjected to a delta or modification relative to the first instance of the stream. In one exemplary implementation, there are two successive backups of the same filesystem, with some amount of churn between the backups.

In block 520, a padding process is performed on the data. The tailored segment can be padded until its length is an integer multiple of the fixed length de-duplication system block size. The tailored segment length can be established in accordance with the expression n*F, where n is an integer and F is a fixed length de-duplication system block size. It is appreciated that a variety of padding patterns can be utilized. In one embodiment, the padding patterns consist of logical zeros. In one exemplary implementation, the fixed length de-duplication system block size is 8K and a segment of 13,719 bytes is extended with logical zeros to 16,384 bytes. The padding can be performed before the tailored segments are written to a container in the fixed length de-duplication system.

In block 530, a map object including a segment descriptor for each tailored segment associated with the data is created. The map object can include an indication of the offset in a stream before padding, an offset in the stream after padding, length before padding, and a length after padding.

In block 540, a read process is performed. In one embodiment, to read a specific segment from a container an anchoring plug in performs a search of the container using the map object to locate the appropriate tailored segment and corresponding variable length segment indicator. If the container is accessed sequentially, it may be sufficient to simply sum the pre-padding length of successive segment descriptors in the map object. In one embodiment, the map object can be loaded into a tree structure. The tree structure can facilitate efficient random searching.

It is appreciated that the tailored segment process can be implemented at a variety of times (e.g., when the data stream is initially received, when there is a change or modification to data associated with the data stream, etc.). In one embodiment, the tailored segment process includes adjusting the alignment padding of at least one of the plurality of tailored segments, wherein an adjustment in the alignment padding of the at least one of the plurality of tailored segments corresponds to a modification in an associated at least one of the plurality of variable length segments. De-duplication can be performed in-line, before writing to a filesystem, after writing to a filesystem, etc.

FIG. 6 is a block diagram of exemplary tailored segment process 600 when a modification to data is made in accordance with one embodiment of the present invention.

In block 610, determining corresponding variable length data in at least one of the plurality of tailored segments is changed. In one embodiment, a received data stream is examined to determine if it is associated with a previously processed tailored segment. If the data stream is associated with a previously processed tailored segment, the data stream is examined for a modification or change and if there is a change or modification the corresponding variable length segment data of the tailored segment is changed accordingly.

In block 620, a first portion of the padding is deleted from the at least one of the corresponding plurality of tailored segments. In one exemplary implementation, the first portion of padding is deleted if data is added to variable length content. In one embodiment, the size of the first portion of padding equal to the size of data added by the change in the data in the at least one of the plurality of variable length segments.

In block 630, a second portion of padding is added to the at least one of the corresponding plurality of tailored segments. In one exemplary implementation, the second portion of padding is added if data is deleted from variable length content. In one embodiment, the size of the second portion of padding equal to the size of data deleted by the change in the data in the at least one of the plurality of variable length segments.

In one embodiment, due to the padding of variable length segments two lengths that are multiples of the block size of a fixed length block de-duplication system (e.g., n*F, etc.), it can be seen that a) the variable length segments are aligned with the fixed block boundary in the fixed length de-duplication system, and b) the variable length segments occupy an integer multiple of fixed length blocks. FIG. 7 is a block diagram of an exemplary variable length segment spanning multiple fixed length blocks of a de-duplication system in accordance with one embodiment of the present invention. In one embodiment, the variable length segment 710 is assigned to tailored segments 721, 722 and 723. Tailored segments 721, 722 and 723 include a variable length segment portion and tailored segment 723 includes a padding portion. In one exemplary implementation, tailored segments 721, 722 can also include padding portions (not shown).

In one embodiment, the variable length segment size is larger than F by an appropriate factor (e.g., 8, 16, etc.). In one exemplary implementation, when F is 8K then the average variable length segment is 32K and bounded by 16K and 48K. The average amount of padding can be ½F, assuming variable length segments are random length between the lower and upper bounds, or possibly substantially less than ½F, if segment sizes are clustered closely to the average size, as could be the case in the previous example. In this example, the worst-case of ½F amounts to 4K of padding per 32 K segment, or a wastage of about 6%. Segments can be compressed by the fixed length de-duplication system, resulting in a reduction of the padding information (e.g. padding bits, padding bytes, etc.) at that time.

In one embodiment, a segment includes a portion of content from a data stream to be de-duplicated, delineated by "anchor points". In one exemplary implementation, a "block" of data is an allocation unit of an underlying fixed length block de-duplication system, and an "extent" is a whole number of "blocks".

Figure 8:
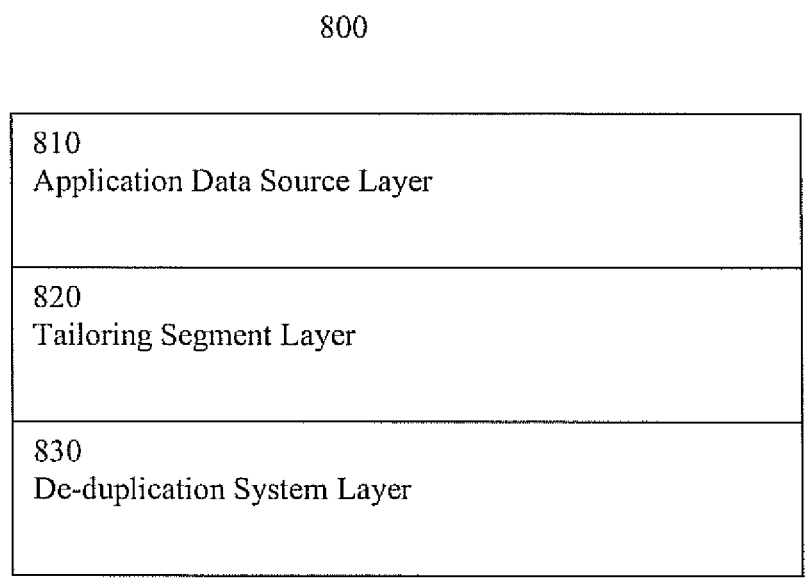
FIG. 8 is a block diagram of an exemplary variable length segment storage hierarchy or architecture in accordance with one embodiment of invention.

In one embodiment, a "thin" component is "inserted" between a data source and fixed length block de-duplication system with little or no modification to the fixed length block de-duplication system. FIG. 8 is a block diagram of an exemplary variable length segment storage hierarchy or architecture in accordance with one embodiment of invention. Variable length segment storage hierarchy 800 includes data generating application 810, tailoring segment layer 820 and fixed length de-duplication system layer 830. In one embodiment, tailoring segment layer 820 can be a thin layer (e.g., filter driver, etc.). In one exemplary implementation, an anchoring plug in performs the tailoring segment operations.

Figure 9:
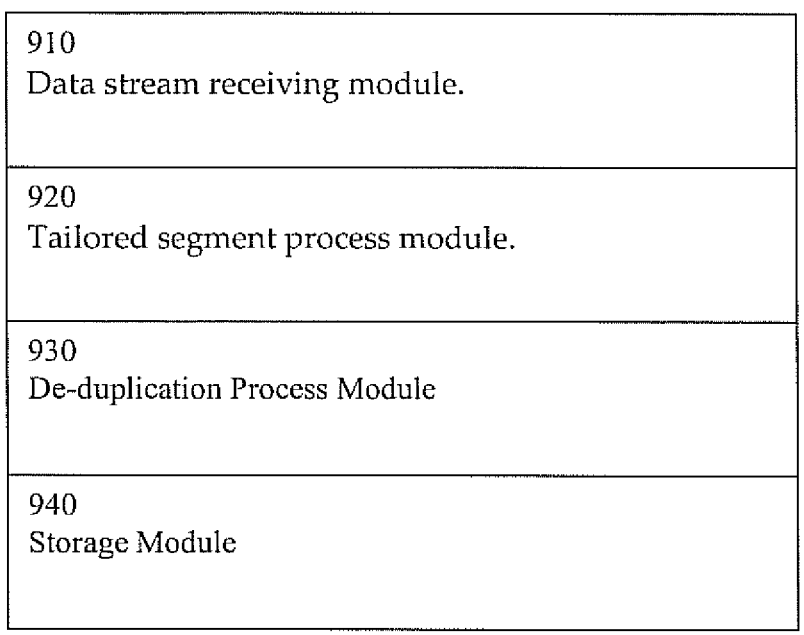
FIG. 9 is a block diagram of an exemplary variable length segment storage module in accordance with one embodiment of the present invention.

FIG. 9 is a block diagram of exemplary variable length segment storage module 900 which includes instructions for directing a processor in the performance of a storage method (e.g., variable length segment storage method 100, etc.) in accordance with one embodiment of the present invention. Variable length segment module 900 includes data stream receiving module 910, tailored segment process module 920 and de-duplication process module 930 and storage module 940. Data stream receiving module 910 includes instructions for performing data stream receiving. In one embodiment, data stream receiving module 910 includes instructions for performing data stream receiving as indicated in block 110. Tailored segmenting module 920 includes instructions for performing tailored segmenting. In one embodiment, tailored segmenting module 920 includes instructions for performing tailored segmenting operations as indicated in block 120. De-duplication module 930 includes instructions for performing de-duplication operations. In one embodiment, de-duplication module 930 includes instructions for performing de-duplication operations as indicated in block 130. Storing module 930 includes instructions for performing information storing operations. In one embodiment, storing module 930 includes instructions for performing information storing operations as indicated in block 140.

Figure 10:
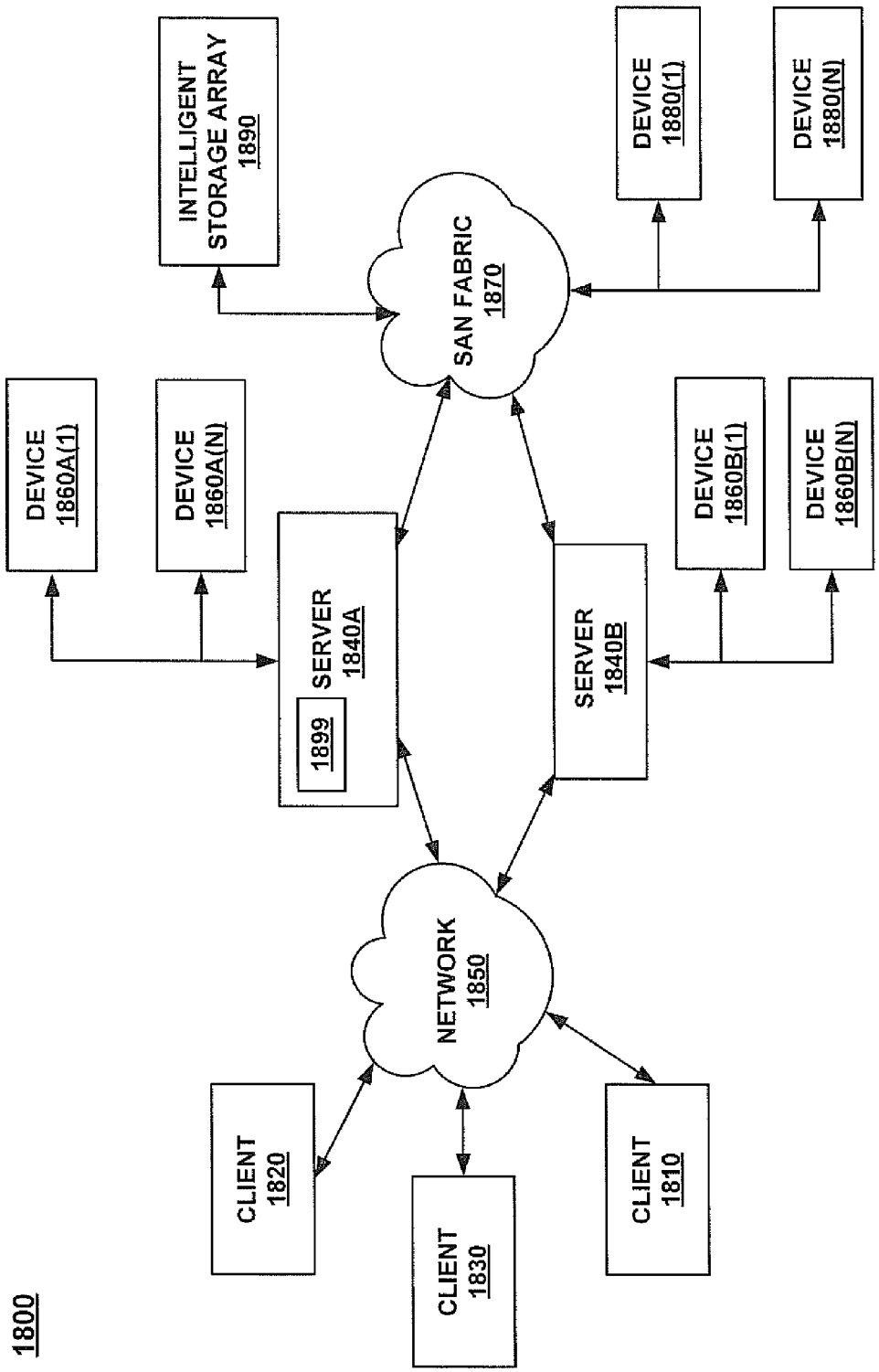
FIG. 10 is a block diagram depicting an exemplary network architecture in accordance with one embodiment of the present invention.

It is appreciated present de-duplication systems and methods can be implemented as part of a variety of environments. For example, de-duplication systems and methods can be implemented as part of a distributed computing environment, a cloud computing environment, a virtual environment, a client server environment, etc. In one embodiment, a de-duplication storage method (e.g., variable length segment storage method 100, etc.) can be implemented on a network. FIG. 10 is a block diagram depicting an exemplary network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes variable length segment storage module 1899. In one embodiment, storage variable length segment storage module 1899 is similar to variable length segment storage module 900. It is appreciated that present systems and methods are compatible with a variety of implementations. For example, portions of information and instructions associated with can be distributed in various resources.

Figure 11:
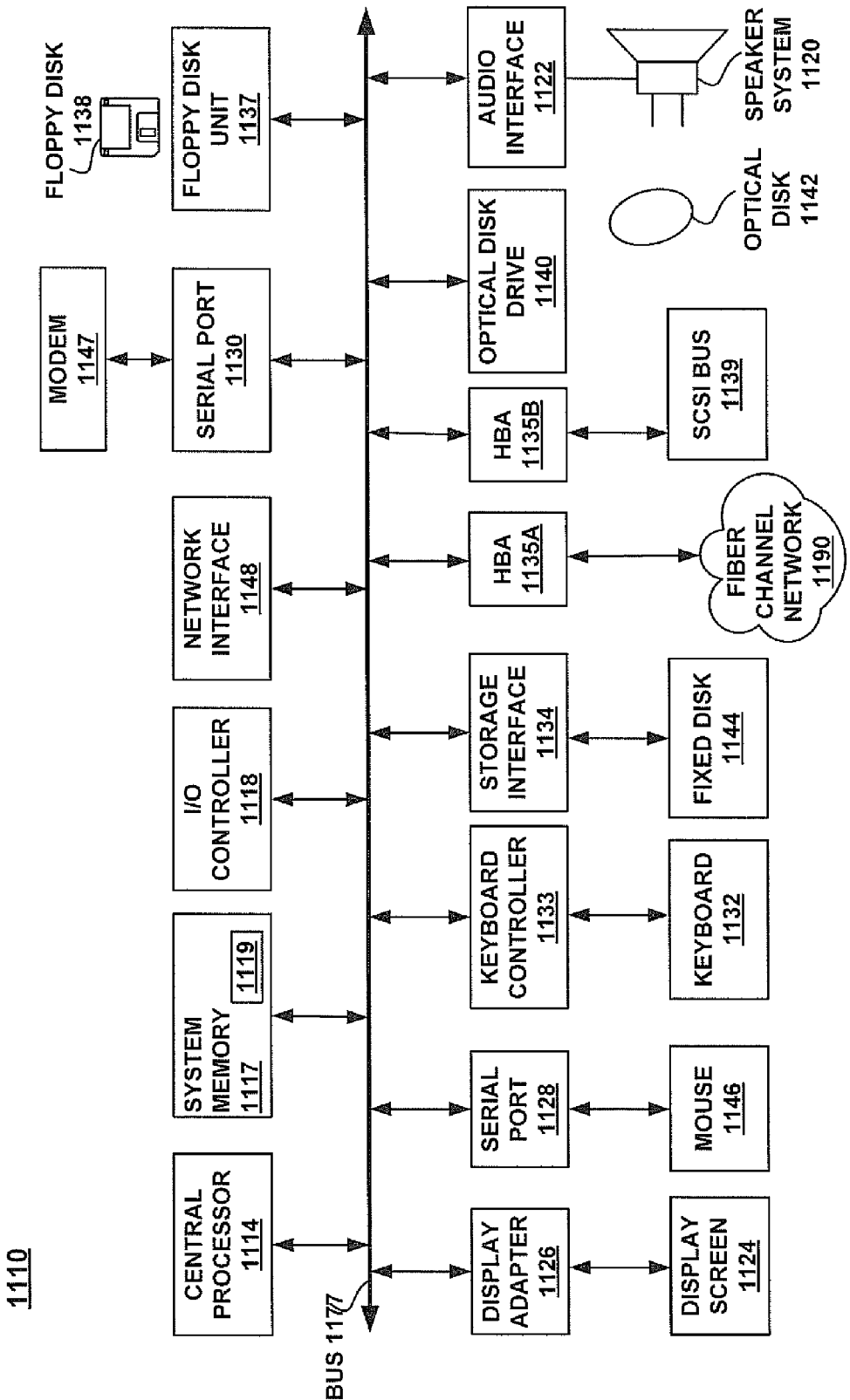
FIG. 11 depicts a block diagram of an exemplary computer system in accordance with one embodiment of the present invention.

FIG. 11 depicts a block diagram of an exemplary computer system 1110 suitable for implementing the present methods.

Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing a storage method (e.g., similar to method 100, etc.) are stored in one or more memories of computer system 1100 (e.g., in memory location 1119). The RAM is generally the main memory into which the operating system and application programs are loaded. In one embodiment, RAM 1117 includes a variable length segment storage module (e.g., in memory location 1119). In one embodiment, a variable length segment storage module stored in memory location 1119 is similar to variable length segment storage module 900. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 10 depicts the use of a network such as the Internet for exchanging data, but the present disclosure is not limited to the Internet or any particular network-based environment.

Thus, the present systems and methods facilitate efficient and effective de-duplication. Unlike conventional attempts, systems and methods similar to those included in the present detailed description can facilitate consistent and convenient elimination of duplicate information. The novel variable length segment storage systems and methods (e.g., method 100, etc.) described herein facilitate de-duplication of variable length segment data by fixed length block de-duplication systems with little or no modification to the fixed length block de-duplication system. The variable length segment storage systems and methods enable realization of variable length de-duplication in conjunction with a fixed block storage system in a convenient and non-intrusive manner.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A variable length segment storage method comprising:
   intercepting, by a filter driver interposed between a data source and a third-party fixed length deduplication system, a data stream in transit from the data source to the third-party fixed length deduplication system for storage in the third-party fixed length deduplication system;
   segmenting, by the filter driver, the data stream into a plurality of variable length segments;
   performing, by the filter driver, a tailored segment process on each variable length segment of the plurality of variable length segments to create a corresponding tailored segment of a plurality of tailored segments by extending the each variable length segment with at least one bit of alignment padding to align with boundaries of a fixed length deduplication scheme; and
   sending, by the filter driver, the plurality of tailored segments as a tailored data stream to the third-party fixed length deduplication system, wherein the third-party fixed length deduplication system is configured to perform a fixed length deduplication process associated with the fixed length deduplication scheme on the plurality of tailored segments and store deduplicated tailored segments corresponding to the result of the deduplication process, without any information about the filter driver and each amount of alignment padding of each tailored segment in the plurality of tailored segments.

2. The variable length segment storage method of claim 1 wherein the tailored segment process includes adjusting, by the filter driver, the alignment padding of the at least one of the plurality of tailored segments, wherein an adjustment in the alignment padding of the at least one of the plurality of tailored segments corresponds to a modification in the at least one of the plurality of variable length segments.

3. The variable length segment storage method of claim 1 wherein the tailored segment process includes:
   intercepting, by a filter driver, a second data stream;
   determining, by the filter driver, corresponding variable length data in at least one of the plurality of tailored segments is changed from the data stream previously stored by the fixed length deduplication system;
   deleting, by the filter driver, a first portion of the padding from the at least one of the corresponding plurality of tailored segments, a size of the first portion of padding equal to a size of data added by the change in the data in the at least one of the plurality of variable length segments; and
   adding, by the filter driver, a second portion of padding to the at least one of the corresponding plurality of tailored segments, a size of the second portion of padding equal to a size of data deleted by the change in the data in the at least one of the plurality of variable length segments.

4. The variable length segment storage method of claim 1 further comprising:
   performing, by the filter driver, a variable length segmenting association process on the data stream;
   performing, by the filter driver, a padding process on the data stream; and
   creating, by the filter driver, a map object including a segment descriptor for each tailored segment associated with the data stream.

5. The variable length segment storage method of claim 1 further comprising compressing, by the filter driver, contents of the tailored segments.

6. The variable length segment storage method of claim 1 wherein anchor points are associated, by the filter driver, with the data of each respective one of the plurality of the variable length segments and each size of each of the plurality of variable length segments size is bounded, by the filter driver, within a range.

7. A non-transitory computer readable storage medium having stored thereon, computer executable instructions that when executed by a computer system cause the computer system to perform a method comprising:
  intercepting, by a filter driver interposed between a data source and a fixed length deduplication system, a data stream in transit from the data source to the fixed length deduplication system for storage in the fixed length deduplication system;
  segmenting, by the filter driver, the data stream into a plurality of variable length segments;
  performing, by the filter driver, a padding adjustment process on the plurality of variable length segments to create a corresponding plurality of tailored segments, wherein at least one of a plurality of tailored segments include corresponding data of at least one of a plurality of variable length segments and alignment padding to align with boundaries of a fixed length deduplication scheme, and wherein each tailored segment of the plurality of tailored segments aligns with the boundaries of the fixed length deduplication scheme; and
  sending, by the filter driver, the corresponding plurality of tailored segments as a tailored data stream to the fixed length deduplication system, wherein the fixed length deduplication system is configured to perform a fixed length deduplication process associated with the fixed length deduplication scheme on the plurality of tailored segments and store deduplicated tailored segments corresponding to the result of the deduplication process.

8. The non-transitory computer readable storage medium of claim 7 wherein the tailored segment process includes adjusting the alignment padding of the at least one of the plurality of tailored segments, wherein an adjustment in the alignment padding of the at least one of the plurality of tailored segments corresponds to a modification in the at least one of the plurality of variable length segments.

9. The non-transitory computer readable storage medium of claim 7 wherein the tailored segment process includes:
  intercepting, by the filter driver, a second data stream;
  determining, by the filter driver, corresponding variable length data in at least one of the plurality of tailored segments is changed from the data stream previously stored by the third-party fixed length deduplication system;
  deleting, by the filter driver, a first portion of the padding from the at least one of the corresponding plurality of tailored segments, a size of the first portion of padding equal to a size of data added by the change in the data in the at least one of the plurality of variable length segments; and
  adding, by the filter driver, a second portion of padding to the at least one of the corresponding plurality of tailored segments, a size of the second portion of padding equal to a size of data deleted by the change in the data in the at least one of the plurality of variable length segments.

10. The non-transitory computer readable storage medium of claim 7 further comprising:
  performing, by the filter driver, a variable length segmenting association process on the data stream;
  performing, by the filter driver, a padding process on the data stream; and
  creating, by the filter driver, a map object including a segment descriptor for each tailored segment associated with the data stream.

11. The non-transitory computer readable storage medium of claim 7 further comprising compressing, via the filter driver, contents of the tailored segments.

12. The non-transitory computer readable storage medium of claim 7 wherein anchor points are associated, by the filter driver, with the data of each respective one of the plurality of the variable length segments and size of each of the plurality of variable length segment size is bounded, by the filter driver, within a range.

13. A computer system comprising:
  a processor coupled to at least one non-transitory computer readable storage medium and executing computer readable code which causes the computer system to perform operations including:
    intercepting, by a filter driver interposed between a data source and a fixed length deduplication system, a data stream in transit from the data source to the fixed length deduplication system for storage in the fixed length deduplication system;
    segmenting, by the filter driver, the data stream into a plurality of variable length segments;
    performing, by the filter driver, a padding adjustment process on the plurality of variable length segments to create a corresponding plurality of tailored segments, wherein at least one of a plurality of tailored segments include corresponding data of at least one of a plurality of variable length segments and alignment padding to align with boundaries of a fixed length deduplication scheme, and wherein each tailored segment of the plurality of tailored segments aligns with the boundaries of the fixed length deduplication scheme;
    sending, by the filter driver, the plurality of tailored segments as a tailored data stream to the fixed length deduplication system, wherein the fixed length deduplication system is configured to perform a fixed length deduplication process associated with the fixed length deduplication scheme on the plurality of tailored segments and store deduplicated tailored segments corresponding to the result of the deduplication process, without any information about the filter driver and each amount of alignment padding of each tailored segment in the plurality of tailored segments.

14. The computer system of claim 13 wherein the tailored segment process includes adjusting, by the filter driver, the alignment padding of the at least one of the plurality of least one of the plurality of tailored segments corresponds to a modification in the at least one of the plurality of variable length segments.

15. The computer system of claim 13 wherein the tailored segment process includes:
  intercepting, by a filter driver, a second data stream;
  determining, by the filter driver, corresponding variable length data in at least one of the plurality of tailored segments is changed from the data stream previously stored by the fixed length deduplication system;

deleting, by the filter driver, a first portion of the padding from the at least one of the corresponding plurality of tailored segments, a size of the first portion of padding equal to a size of data added by the change in the data in the at least one of the plurality of variable length segments; and adding, by the filter driver, a second portion of padding to the at least one of the corresponding plurality of tailored segments, a size of the second portion of padding equal to a size of data deleted by the change in the data in the at least one of the plurality of variable length segments.

16. The computer system of claim 13 further comprising:

performing, by the filter driver, a variable length segmenting association process on the data stream;

performing, by the filter driver, a padding process on the data stream; and creating, by the filter driver, a map object including a segment descriptor for each tailored segment associated with the data stream.

17. The computer system of claim 13 wherein anchor points are associated, by the filter driver, with the data of each respective one of the plurality of the variable length segments and each size of each of the plurality of variable length segments size is bounded, by the filter driver, within a range.

18. A deduplicated storage method comprising:

intercepting, by a filter driver interposed between a data source and a fixed length deduplication system, a data stream in transit from the data source to the fixed length deduplication system for storage in the fixed length deduplication system;

identifying, by the filter driver, a fixed segment length of the deduplication system;

applying, by the filter driver, a variable length segment process to the data stream to identify a plurality of variably-spaced anchor points in the data stream;

modifying the data stream by inserting, by the filter driver, at least one padding bit at each anchor point of the plurality of variably-spaced anchor points so that a distance between two consecutive anchor points equals an integer multiple of the fixed length segment length; and sending, by the filter driver, the modified data stream to the fixed length deduplication system, wherein the fixed length deduplication system stores deduplicated fixed length segments of the modified data stream, without any information about the filter driver and each position of each anchor bit of the plurality of anchor bits.

* * * * *